United States Patent
Zhou et al.

(10) Patent No.: US 12,176,582 B2
(45) Date of Patent: Dec. 24, 2024

(54) BATTERY CELL, BATTERY, ELECTRICAL DEVICE, AND METHOD AND DEVICE FOR MANUFACTURING BATTERY CELL

(71) Applicant: CONTEMPORARY AMPEREX TECHNOLOGY (HONG KONG) LIMITED, Hong Kong (CN)

(72) Inventors: Wenlin Zhou, Ningde (CN); Shengwang Chen, Ningde (CN); Liangfan Xu, Ningde (CN); Quankun Li, Ningde (CN); Xing Li, Ningde (CN)

(73) Assignee: Contemporary Amperex Technology (Hong Kong) Limited, Hong Kong (CN)

(*) Notice: Subject to any disclaimer, the term of this patent is extended or adjusted under 35 U.S.C. 154(b) by 227 days.

(21) Appl. No.: 18/149,674

(22) Filed: Jan. 4, 2023

(65) Prior Publication Data

US 2023/0223669 A1    Jul. 13, 2023

Related U.S. Application Data

(63) Continuation of application No. PCT/CN2021/107472, filed on Jul. 20, 2021.

(51) Int. Cl.
*H01M 50/586* (2021.01)
*H01M 10/04* (2006.01)
(Continued)

(52) U.S. Cl.
CPC ..... *H01M 50/586* (2021.01); *H01M 10/0404* (2013.01); *H01M 50/103* (2021.01);
(Continued)

(58) Field of Classification Search
CPC .................................................. H01M 50/586
See application file for complete search history.

(56) References Cited

U.S. PATENT DOCUMENTS

| | | |
|---|---|---|
| 2018/0261806 A1 | 9/2018 | Kawate |
| 2020/0395577 A1 | 12/2020 | Ogawa |
| 2023/0223657 A1* | 7/2023 | Yamamoto .......... H01M 50/538 429/94 |

FOREIGN PATENT DOCUMENTS

| | | |
|---|---|---|
| CN | 207038571 U | 2/2018 |
| CN | 108428852 A | 8/2018 |

(Continued)

OTHER PUBLICATIONS

Notice of Reasons for Refusal received in the corresponding Japanese Application 2022-558428, mailed Nov. 7, 2023.

(Continued)

*Primary Examiner* — Brian R Ohara
(74) *Attorney, Agent, or Firm* — Kilpatrick Townsend & Stockton LLP

(57) ABSTRACT

A battery cell, a battery, an electrical device, and a method and device for manufacturing the battery cell. In some embodiments, the battery cell comprises a battery core, a shell, an end cover, and a first insulating component. The battery core comprises a main body part and electrode tabs protruding from the main body part. The shell has a first opening and is configured to accommodate the battery core. The end cover is configured to cover the first opening. The first insulating component comprises an insulating main body and an insulating part, wherein the insulating main body is located on a side, facing the electrode tabs, of the end cover, and the insulating main body is configured to isolate the battery core from the end cover.

15 Claims, 6 Drawing Sheets

(51) Int. Cl.
*H01M 50/103* (2021.01)
*H01M 50/15* (2021.01)
*H01M 50/209* (2021.01)
*H01M 50/593* (2021.01)

(52) U.S. Cl.
CPC ......... *H01M 50/15* (2021.01); *H01M 50/209* (2021.01); *H01M 50/593* (2021.01); *H01M 2200/00* (2013.01); *H01M 2220/20* (2013.01)

(56) References Cited

FOREIGN PATENT DOCUMENTS

| CN | 211530012 U | 9/2020 |
| CN | 212625814 U | 2/2021 |
| EP | 4106088 A1 | 12/2022 |
| EP | 4261963 A1 | 10/2023 |
| JP | 2011070918 A | 4/2011 |
| JP | 2015106534 A | 6/2015 |
| JP | 2015204248 A | 11/2015 |
| WO | 2015159717 A1 | 10/2015 |
| WO | 2020196095 A1 | 10/2020 |
| WO | 2021049032 A1 | 3/2021 |

OTHER PUBLICATIONS

The international search report received in the corresponding International Application PCT/CN2021/107472, mailed Mar. 30, 2022.
The written opinion received in the corresponding International Application PCT/CN2021/107472, mailed Mar. 30, 2022.
Decision to Grant a Patent received in the corresponding Japanese Application 2022-558428, mailed on Apr. 9, 2024.
The extended European search report received in the corresponding European Application 21935427.1, mailed on Aug. 5, 2024.

* cited by examiner

BATTERY CELL, BATTERY, ELECTRICAL DEVICE, AND METHOD AND DEVICE FOR MANUFACTURING BATTERY CELL

CROSS-REFERENCE TO RELATED APPLICATIONS

This application is a continuation of International Application No. PCT/CN2021/107472, filed Jul. 20, 2021, and entitled "BATTERY CELL, BATTERY, ELECTRICAL DEVICE, AND METHOD AND DEVICE FOR MANUFACTURING BATTERY CELL", which is incorporated herein by reference in its entirety.

TECHNICAL FIELD

The present application relates to the technical field of batteries, and in particular, relates to a battery cell, a battery, an electrical device, and a method and device for manufacturing the battery cell.

BACKGROUND ART

Batteries are widely used in electronic devices, such as mobile phones, notebook computers, electric mopeds, electric vehicles, electric aircraft, electric ships, electric toy vehicles, electric toy ships, electric toy aircrafts, and electric tools.

In battery technology, in addition to performance, safety of the batteries also needs to be considered. Therefore, how to improve the safety of the batteries is an urgent problem to be solved in the battery technology.

SUMMARY OF THE INVENTION

Various embodiments of the present application provide a battery cell, a battery, an electrical device, and a method and device for manufacturing the battery cell, which can effectively improve the safety of the battery cell.

In a first aspect, the embodiments of the present application provide a battery cell which comprises a battery core, a shell, an end cover, and a first insulator, wherein the battery core comprises a main body part and electrode tabs protruding from the main body part; the shell has a first opening and is configured to accommodate the battery core; the end cover is configured to cover the first opening; and the first insulating component comprises an insulating main body and an insulating part, wherein the insulating main body is located on a side, facing the electrode tabs, of the end cover, and the insulating main body is configured to isolate the battery core from the end cover; and the insulating part extends from the insulating main body and away from the end cover and is partially located between an outer circumferential surface of the main body part and an inner circumferential surface of the shell, and the insulating part is configured to isolate the electrode tabs from the shell.

In the above technical solution, the insulating part extends from the insulating main body and away from the end cover and is partially located between the outer circumferential surface of the main body part and the inner circumferential surface of the shell, and the insulating part plays a role of isolating the electrode tabs from the shell, so as to reduce the risk of a short circuit caused by the contact between the electrode tabs and the shell. Thus, the safety of the battery cell is effectively improved.

In some embodiments, the battery cell further comprises a second insulating component located in the shell, wherein the second insulating component is configured to isolate the main body part from the shell, and the insulating part is connected to the second insulating component.

In the above technical solution, the second insulating component plays a role of isolating the main body part from the shell, so as to reduce the risk of a short circuit caused by the contact between the main body part and the shell; and the insulating part is connected to the second insulating component, and the second insulating component can play a role of stabilizing the insulating part and keep the insulating part at a position where the electrode tabs are isolated from the shell.

In some embodiments, an accommodating space having one end provided with a second opening is formed in the second insulating component, and the accommodating space is configured to accommodate at least one portion of the main body part; the second opening faces the insulating main body; and the insulating part extends from the insulating main body towards the second opening and is connected to the second insulating component.

In the above technical solution, the accommodating space having one end provided with the second opening is formed in the second insulating component, and the accommodating space is configured to accommodate at least one portion of the main body part, so that the second insulating component can separate the battery core from the shell in different directions. As the insulating part extends from the insulating main body towards the second opening and is connected to the second insulating component, the first insulating component, the second insulating component, and the battery core can serve as an integral structure in a process of assembling the battery cell, so as to be more conveniently assembled with the shell. Thus, the assembly efficiency of the battery cell is improved.

In some embodiments, the insulating part and the second insulating component are connected by hot melting. Alternatively, the insulating part and the second insulating component are connected by bonding.

In the above technical solution, the insulating part and the second insulating component may be connected together by the hot melting, or connected together by the bonding; a connection way of the insulating part and the second insulating component is simple and easy to realize and can guarantee firmness of the insulating part and the second insulating component after the insulating part and the second insulating component are connected.

In some embodiments, the insulating part is connected to a peripheral edge of the insulating main body.

In the above technical solution, the insulating part is connected to the peripheral edge of the insulating main body, so as to be closer to the inner circumferential surface of the shell; and the main body part of the battery core is configured as large as possible, which is conducive to improving the energy density of the battery cell.

In some embodiments, a crease is formed at the connection position between the insulating part and the insulating main body, and the insulating part is hinged to the insulating main body along the crease.

In the above technical solution, the crease is formed at the connection position between the insulating part and the insulating main body, so that the first insulating component can be formed by folding a plate-shaped component along the crease. As the insulating part is hinged to the insulating main body along the crease, when the main body part of the battery core extrudes the insulating part due to expansion of the main body part, the insulating part can turn by a certain angle about the crease relative to the insulating main body, so that the risk of damage, caused by extrusion of the insulating part during the expansion of the main body part, of the main body part is reduced.

In some embodiments, the first insulating component comprises a plurality of the insulating parts circumferentially distributed along the outer circumferential surface of the main body part.

In the above technical solution, the first insulating component comprises a plurality of insulating parts circumferentially distributed along the outer circumferential surface of the main body part, such that the insulating part can isolate the electrode tabs from the shell in different directions. Thus, the risk of the contact between the electrode tabs and the shell is reduced.

In some embodiments, the main body part comprises a plurality of electrode assemblies arranged in a stacked manner in a width direction of the end cover; and an end of each electrode assembly in a thickness direction of the end cover is provided with two of the electrode tabs arrayed in a length direction of the end cover. Two ends of the insulating main body in the length direction of the end cover are provided with the insulating parts located on two sides of the main body part; and in the length direction of the end cover, the insulating part at each end of the insulating main body is configured to isolate one of the electrode tabs of the electrode assembly from the shell.

In the above technical solution, the two ends of the insulating main body in the length direction of the end cover are each provided with the insulating parts located on the two sides of the main body part, the insulating part at each end of the insulating main body can correspondingly isolate one electrode tab of the electrode assembly from the shell in the length direction of the end cover, that is, the shell and one electrode tab of the electrode assembly in the length direction of the end cover are isolated from each other by the insulating part at one end of the insulating main body, and the shell and the other electrode tab of the electrode assembly in the length direction of the end cover are isolated from each other by the insulating part at the other end of the insulating main body, such that the two electrode tabs of the electrode assembly are unlikely to be in contact with the shell in the length direction of the end cover.

In other embodiments, the two ends of the insulating main body in the length direction of the end cover are each provided with one of the insulating part.

In the above technical solution, the two ends of the insulating main body in the length direction of the end cover are each provided with one insulating part, that is, the shell and the electrode tab on one side of the electrode assembly in the length direction of the end cover are isolated from each other by the same insulating part, and the shell and the electrode tab on the other side of the electrode assembly in the length direction of the end cover are also isolated from each other by the same insulating part. In addition, the insulating parts at the two ends of the insulating main body in the length direction of the end cover play a role of isolating the electrode assembly from the shell; and even if the electrode assembly expands in the length direction of the end cover, the electrode assembly is unlikely to be in contact with the shell, so that a short circuit caused by the contact between the electrode assembly and the shell after the expansion of the electrode assembly is less prone to occur.

In other embodiments, the two ends of the insulating main body in the length direction of the end cover are each provided with a plurality of the insulating parts in a spaced manner; and a receding groove is formed between every two adjacent electrode assemblies and located at an end of the main body part in the length direction of the end cover, and the receding groove is configured to avoid the insulating part.

In the above technical solution, the receding groove is formed between every two adjacent electrode assemblies and located at the end of the main body part in the length direction of the end cover, and the receding groove can avoid the insulating part. Thus, during the expansion of the electrode assembly, the electrode assembly is unlikely to be extruded by the insulating part, such that the risk of damage, caused by extrusion of the insulating part during the expansion of the electrode assembly, of the electrode assembly is reduced.

In some embodiments, round surfaces are formed at two ends of the electrode assembly in the length direction of the end cover; and two round surfaces, located at the same end of the main body part in the length direction of the end cover, of every two adjacent electrode assemblies jointly define the receding groove.

In the above technical solution, the receding groove is jointly defined by the round surfaces of two adjacent electrode assemblies, such that a simple structure is achieved.

In some embodiments, the insulating part does not exceed the receding groove in the length direction of the end cover towards the outside.

In the above technical solution, in the length direction of the end cover towards the outside, the insulating part does not exceed the receding groove; that is, the insulating part is completely located in the receding groove in the length direction of the end cover, and the insulating part does not excessively occupy the space between the outer circumferential surface of the main body part and the inner circumferential surface of the shell, which is conducive to improving the energy density of the battery cell.

In some embodiments, two ends of the insulating main body in the width direction of the end cover are provided with the insulating parts located on two sides of the main body part, so as to isolate the electrode tabs from the shell in the width direction of the end cover.

In the above technical solution, the two ends of the insulating main body in the width direction of the end cover are provided with the insulating parts located on the two sides of the main body part, and the insulating parts can isolate the electrode tabs from the shell in the width direction of the end cover, so as to further reduce the risk of the contact between the electrode tabs and the shell.

In a second aspect, the embodiments of the present application provide a battery which comprises the battery cell provided by any one of the embodiments in the first aspect as well as a case for accommodating the battery cell.

In a third aspect, the embodiments of the present application provide an electrical device which comprises the battery provided by any one of the embodiments in the second aspect.

In a fourth aspect, the embodiments of the present application provide a method for manufacturing a battery cell. The method comprises: providing a battery core which comprises a main body part and electrode tabs protruding from the main body part; providing a shell having a first opening; providing an end cover and a first insulating component, wherein the first insulating component comprises an insulating main body and an insulating part; accommodating the battery core in the shell; and covering the first opening with the end cover, wherein the insulating main body is located on a side, facing the electrode tabs, of the end cover; wherein the insulating main body is configured to isolate the battery core from the end cover; and the insulating part extends from the insulating main body and away from the end cover and is partially located between an outer circumferential surface of the main body part and an inner circumferential surface of the shell, and the insulating part is configured to isolate the electrode tabs from the shell.

In a fifth aspect, the embodiments of the present application provide a manufacturing device for battery cells. The device comprises a first providing device, a second providing device, a third providing device, and an assembly device.

The first providing device is configured to provide a battery core which comprises a main body part and electrode tabs protruding from the main body part; the second providing device is configured to provide a shell having a first opening; The third providing device is configured to provide an end cover and a first insulating component, and the first insulating component comprises an insulating main body and an insulating part; the assembly device is configured to accommodate the battery core in the shell, and is also configured to cover the first opening with the end cover; wherein the insulating main body is configured to isolate the battery core from the end cover; and the insulating part extends from the insulating main body and away from the end cover and is partially located between an outer circumferential surface of the main body part and an inner circumferential surface of the shell, and the insulating part is configured to isolate the electrode tabs from the shell.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labour.

Figure 1:
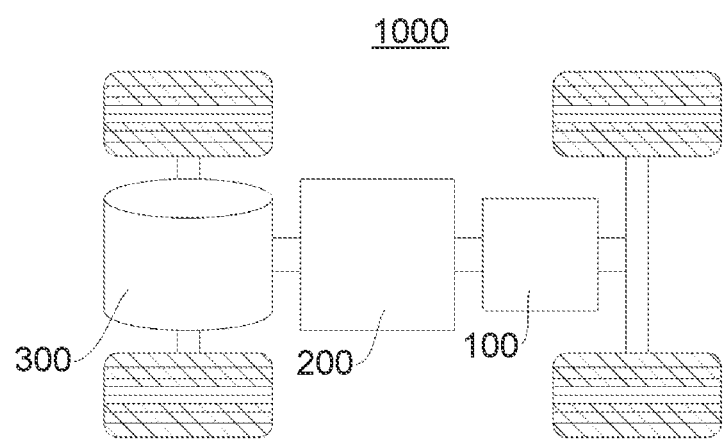
FIG. 1 is a structural diagram of a vehicle provided by some embodiments of the present application.

Reference numerals: 10—case; 11—first portion; 12—second portion; 13—accommodating cavity; 20—battery cell; 21—battery core; 211—main body part; 2111—electrode assembly; 2111a—round surface; 2111b—protruding point; 2112—top surface; 2113—receding groove; 212—electrode tab; 212a—positive electrode tab; 212b—negative electrode tab; 22—shell; 221—first opening; 23—end cover; 231—second recess; 232—second protrusion; 24—first insulating component; 241—insulating main body; 2411—first recess; 2412—first protrusion; 242—insulating part; 243—crease; 30—battery module; 31—busbar component; 40—positive electrode terminal; 50—negative electrode terminal; 60—current collecting member; 70—second insulating component; 71—second opening; 72—accommodating space; 100—battery; 200—controller; 300—motor; 1000—vehicle; 2000—manufacturing device; 2100—first providing device; 2200—second providing device; 2300—third providing device; 2400—assembly device; X—length direction; Y—width direction; Z—thickness direction.

DETAILED DESCRIPTION OF EMBODIMENTS

In order to make the objectives, technical solutions and advantages of the embodiments of the present application clearer, the technical solutions in the embodiments of the present application will be described clearly below in conjunction with the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the drawings described above are intended to cover non-exclusive inclusion. The terms "first", "second" etc. in the specification and the claims of the present application as well as the above drawings are configured to distinguish different objects, rather than describing a specific order or a primary-secondary relationship.

In the present application, "embodiment" mentioned means that the specific features, structures and characteristics described in conjunction with the embodiments may be are included in at least one embodiment of the present application. The phrase at various locations in the specification does not necessarily refer to the same embodiment, or an independent or alternative embodiment exclusive of another embodiment.

In the description of the present application, it should be noted that, unless otherwise clearly specified and defined, meanings of terms "install", "connect with", and "connect to", and "attach" should be understood in a board sense. For example, the connection may be a fixed connection, a detachable connection, or an integral connection; may be a direct connection, an indirect connection by means of an intermediate medium, or internal communication between two elements. For those of ordinary skill in the art, the specific meaning of the terms mentioned above in the present application can be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the drawings, as well as the dimensions, such as overall thickness, length and width, of an integrated device are illustrative only and should not be construed to limit the present application in any way.

In the present application, the phrase "a plurality of" means two or more (including two).

In the present application, a battery cell may include a lithium ion secondary battery, a lithium ion primary battery, a lithium-sulfur battery, a sodium/lithium ion battery, a sodium ion battery or a magnesium ion battery, and the like, which is not limited in the embodiments of the present application. The battery cell may be cylindrical, flat, cuboid or in another shape, which is not limited in the embodiments of the present application. The battery cell is generally classified into three types according to a packaging approach: a cylindrical battery cell, a cuboid battery cell, and a pouch battery cell, which is also not limited in the embodiments of the present application.

A battery mentioned in the embodiments of the present application refers to a single physical module comprising one or more battery cells to provide a larger voltage and capacity. For example, the battery mentioned in the present application may include a battery module or a battery pack, and the like. The battery generally comprises a case for packaging one or more battery cells. The case can prevent liquid or other foreign matters from affecting charging or discharging of the battery cell.

The battery cell comprises an electrode assembly and an electrolyte solution, wherein the electrode assembly is composed of a positive electrode plate, a negative electrode plate and an isolating membrane. The operation of the battery cell mainly relies on the movement of metal ions between the positive electrode plate and the negative electrode plate. The positive electrode plate comprises a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive electrode tab. A lithium ion battery is taken as an example, the positive electrode current collector may be made of aluminium, and a positive electrode active material may be lithium cobalt oxide, lithium iron phosphate, ternary lithium, lithium manganate, or the like. The negative electrode plate comprises a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative electrode tab. The negative electrode current collector may be made of copper, and a negative electrode active material may be carbon, silicon, or the like. In order to ensure that no fusing occurs when a large current passes, a plurality of positive electrode tabs are provided and are stacked together, and a plurality of negative electrode tabs are provided and are stacked together. The isolating membrane may be made from PP (polypropylene), PE (polyethylene), or the like. In addition, the electrode assembly may be of a winding structure or a laminated structure, which is not limited in the embodiments of the present application.

Design factors on many aspects need to be simultaneously considered for the development of the battery technology, such as energy density, cycle life, discharge capacity, charge-discharge rate, and other performance parameters. In addition, the safety of the battery needs to be taken into account.

For a common battery cell, the risk of a short circuit probably occurs in the battery cell, and safety of the battery cell needs to be improved. According to research of the inventor, no insulating treatment is performed between an electrode tab of a battery core and a shell; and in a vibration environment, the electrode tab probably offsets and makes contact with the shell, resulting in a short circuit in the battery cell.

In view of this, the embodiments of the present application provide the following technical solution: an insulating part plays a role of isolating the electrode tabs from the shell in such a way that the insulating part of a first insulating component extends from an insulating main body and away from an end cover and is partially arranged between an outer circumferential surface of a main body part and an inner circumferential surface of the shell, so as to reduce the risk of a short circuit caused by the contact between the electrode tabs and the shell. Thus, the safety of the battery cell is effectively improved.

The technical solution described in the embodiments of the present application is applicable to the battery and an electrical device using the battery.

The electrical device may be a vehicle, a mobile phone, a portable device, a notebook computer, a ship, a spacecraft, an electric toy, an electric tool, and the like. The vehicle may be a fuel vehicle, a natural gas vehicle, or a new-energy vehicle. The new-energy vehicle may be a battery electric vehicle, a hybrid electric vehicle, an extended-range electric vehicle, or the like. The spacecraft includes a plane, a rocket, a space shuttle, a space vehicle, or the like. The electric toy includes a stationary or mobile electric toy such as a video game console, an electric toy vehicle, an electric toy ship, and an electric toy plane. The electric tool includes an electric metal-cutting tool, an electric grinding tool, an electric assembly tool, and an electric tool for a railway, such as an electric drill, an electric grinder, an electric spanner, an electric screwdriver, an electric hammer, an electric impact drill, a concrete vibrator, and an electric planer. The electrical devices mentioned above are not specially limited in the embodiments of the present application.

For ease of description, a case in which the electrical device refers to a vehicle is taken as an example to be described in the following embodiments.

Referring to FIG. 1 which is a structural diagram of a vehicle 1000 provided by some embodiments of the present application, a battery 100 is provided inside the vehicle 1000, and the battery 100 may be arranged at a bottom, head, or tail of the vehicle 1000. The battery 100 may be configured to supply power to the vehicle 1000. For example, the battery 100 may serve as an operating power supply of the vehicle 1000.

The vehicle 1000 may further comprise a controller 200 and a motor 300, wherein and the controller 200 is configured to control the battery 100 to supply power to the motor 300, for example, to satisfy power demands during starting, navigation and traveling of the vehicle 1000.

In some embodiments of the present application, the battery 100 can not only serve as the operating power supply of the vehicle 1000, but also serve as a driving power supply of the vehicle 1000, so as to replace or partially replace fuel or natural gas to provide driving power for the vehicle 1000.

Figure 2:
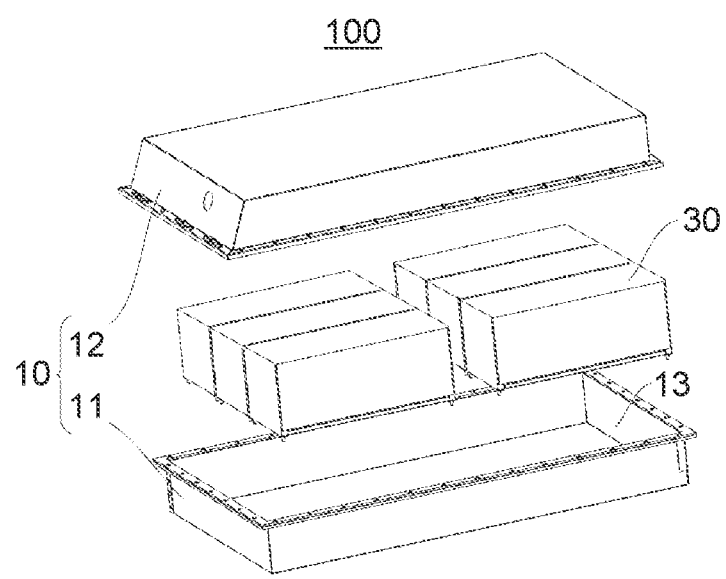
FIG. 2 is a structural diagram of a battery provided by some embodiments of the present application.

In some embodiments, referring to FIG. 2 which is a structural diagram of a battery 100 provided by some embodiments of the present application, the battery 100 comprises a case 10 and a battery cell 20 (not shown in FIG. 2), wherein the case 10 is configured to accommodate the battery cell 20.

The case 10 may comprise a first portion 11 and a second portion 12. The first portion 11 and the second portion 12 covers each other to define an accommodating cavity 13 for accommodating the battery cell 20. The first portion 11 and the second portion 12 may be of various shapes such as a cuboid and a cylinder. The first portion 11 may be of a hollow structure with an open side, the second portion 12 may also be of a hollow structure with an open side, and the open side of the second portion 12 covers the open side of the first portion 11, such that the case 10 having the accommodating cavity 13 is formed. Alternatively, the first portion 11 is of a hollow structure with an open side, the second portion 12 is of a plate-shaped structure, and the second portion 12 covers the open side of the first portion 11, such that the case 10 having the accommodating cavity 13 is formed.

Herein, the first portion 11 and the second portion 12 can be sealed by a sealing element, and the sealing element may be a sealing ring, a sealant, or the like.

In the battery 100, the battery cell 20 may be one or more. If a plurality of battery cells 20 are provided, the plurality of battery cells 20 may be connected in series, in parallel, or in series and parallel. A parallel-series connection refers that some of the plurality of battery cells 20 are connected in series and the rest of the plurality of battery cells are connected in parallel.

Figure 3:
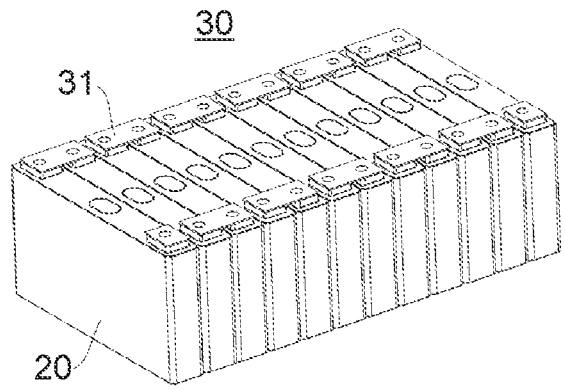
FIG. 3 is a structural diagram of a battery module shown in FIG. 2.

In some embodiments, referring to FIG. 3 which is a structural diagram of the battery module 30 shown in FIG. 2, a plurality of battery cells 20 may be connected in series, in parallel, or in series and parallel to form the battery module 30 first, and then a plurality of battery modules 30 are connected in series, in parallel, or in series and parallel to form an integral structure to be accommodated in the case 10 (shown in FIG. 2). In other embodiments, the plurality of battery cells 20 may be directly connected together in series, in parallel, or in series and parallel, and then an integral structure formed by the plurality of battery cells 20 is accommodated in the case 10.

In some embodiments, the battery 100 may further comprise busbar components 31, and the plurality of battery cells 20 can be electrically connected to one another through the busbar component 31, so as to be connected in series, in parallel, or in series and parallel.

The busbar component 31 may be a metal conductor such as a copper conductor, an iron conductor, an aluminium conductor, a stainless steel conductor, and an aluminium alloy conductor.

Figure 4:
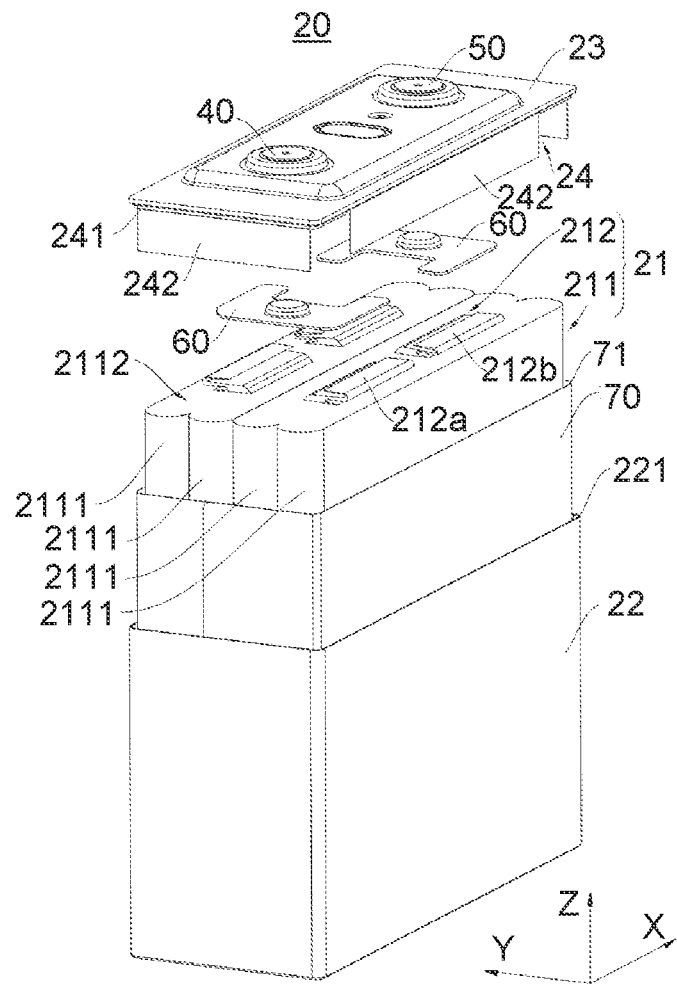
FIG. 4 is an exploded view of a battery cell provided by some embodiments of the present application.

Referring to FIG. 4 which is an exploded view of the battery cell 20 provided by some embodiments of the present application, the battery cell 20 comprises a battery core 21, a shell 22, an end cover 23 and a first insulating component 24. The battery core 21 comprises a main body part 211 and electrode tabs 212 protruding from the main body part 211. The shell 22 has a first opening 221, and the shell 22 is configured to accommodate the battery core 21. The end cover 23 is configured to cover the first opening 221. The first insulating component 24 is located on a side, facing the electrode tabs 212, of the end cover 23, and the first insulating component 24 is configured to isolate the battery core 21 from the end cover 23 and isolate the electrode tabs 212 and the shell 22. In other words, the first insulating component 24 can not only play a role of isolating the whole battery core 21 from the end cover 23, but also play a role of isolating the electrode tabs 212 from the shell 22, thus improving the safety of the battery cell 20.

In some embodiments, the main body part 211 comprises at least one electrode assembly 2111, that is, the electrode assembly 2111 of the main body part 211 may be one or more. The electrode assembly 2111 may comprise a positive electrode plate, a negative electrode plate, and an isolating membrane. The electrode assembly 2111 may be of a winding structure formed by winding the positive electrode plate, the isolating membrane, and the negative electrode plate, or of a laminated structure formed by laminating the positive electrode plate, the isolating membrane, and the negative electrode plate. Each electrode assembly 2111 is correspondingly provided with two electrode tabs 212 with opposite polarity, and the two electrode tabs 212 are respectively a positive electrode tab 212a and a negative electrode tab 212b. The positive electrode tab 212a and the negative electrode tab 212b may be located at the same end of the electrode assembly 2111 in a thickness direction Z of the end cover 23, or located at opposite ends of the electrode assembly 2111 in the thickness direction Z of the end cover 23. In FIG. 4, a case in which the positive electrode tab 212a and the negative electrode tab 212b are located at the same end of the electrode assembly 2111 is shown as an example.

Herein, the positive electrode plate comprises a positive electrode current collector and positive electrode active material layers coated on two opposite sides of the positive electrode current collector; and the negative electrode plate comprises a negative electrode current collector and negative electrode active material layers coated on two opposite sides of the negative electrode current collector. The positive electrode tab 212a may be a region of the positive electrode plate that is not coated with the positive electrode active material layer, and the negative electrode tab 212b may be a region of the negative electrode plate that is not coated with the negative electrode active material layer.

In some embodiments, as shown in FIG. 4, the main body part 211 comprises a plurality of electrode assemblies 2111 arranged in a stacked manner in a width direction Y of the end cover 23; an end of the electrode assembly 2111 in the thickness direction Z of the end cover 23 is provided with two electrode tabs 212 arrayed in a length direction X of the end cover 23; and the two electrode tabs 212 are respectively the positive electrode tab 212a and the negative electrode tab 212b.

As an example, an even number of electrode assemblies 2111 of the main body part 211 are provided; every two electrode assemblies 2111 form one electrode assembly unit; and in the electrode assembly unit, the positive electrode tabs 212*a* of the two electrode assemblies 2111 are folded together, and the negative electrode tabs 212*b* of the two electrode assemblies 2111 are folded together. A case in which four electrode assemblies 2111 of the main body part 211 are provided is taken as an example; wherein, two of the electrode assemblies 2111 form an electrode assembly unit, and the other two of the electrode assemblies 2111 also form an electrode assembly unit.

In the embodiments of the present application, the shell 22 may be of various shapes such as a cylinder and a cuboid. The shell 22 may be matched with the battery core 21 in shape. For example, the battery core 21 and the shell 22 are both cylindrical. For another example, the battery core 21 and the shell 22 are both cuboid.

The shell 22 may be made of various materials, and the shell 22 may be made of metal such as copper, iron, aluminium, stainless steel, and an aluminium alloy, which is not specially limited in the embodiments of the present application.

In the embodiments of the present application, the end cover 23 may also be of various shapes such as a cylinder and a cuboid. Definitely, if the shell 22 is cylindrical, the end cover 23 may be of a cylindrical structure matched with the shell 22; and if the shell 22 is cuboid, the end cover 23 may be of a cuboid structure matched with the shell 22.

The end cover 23 plays a role of covering the first opening 221 of the shell 22 to form a closed space for accommodating the battery core 21 and an electrolyte together with the shell 22, and the electrolyte may be the electrolyte solution.

It should be noted that the end cover 23 of the battery cell 20 may be one or two. It can be understood that if one end cover 23 is provided, the shell 22 is of a hollow structure having one end provided with the first opening 221; if two end covers 23 are provided, the shell 22 is of a hollow structure of which two ends are provided with first openings 221; and the two end covers 23 are configured to cover the two first openings 221 of the shell 22, respectively.

In some embodiments, the shell 22 and the battery core 21 are both cylindrical; two end covers 23 are provided, and the shell 22 is of a hollow structure of which two ends are each provided with one first opening 221; the two end covers 23 cover the two first openings 221 of the shell 22, respectively; and the positive electrode tab 212*a* and the negative electrode tab 212*b* are respectively arranged at two ends of the electrode assembly 2111 in the thickness direction Z of the end cover 23. In other embodiments, as shown in FIG. 4, the shell 22 and the battery core 21 are both cuboid; one end cover 23 is provided, and the shell 22 is of the hollow structure having one end provided with the first opening 221; the end cover 23 covers the first opening 221 of the shell 22; and the positive electrode tab 212*a* and the negative electrode tab 212*b* are arranged at the same end of the electrode assembly 2111 in the thickness direction Z of the end cover 23.

It should be noted that in a case where two end covers 23 of the battery cell 20 are provided, the first insulating component 24 may be one or two. If one first insulating component 24 is provided, the first insulating component 24 only separates the electrode tabs 212 at the end of electrode assembly 2111 in the thickness direction Z of the end cover 23 from the shell 22; and if two first insulating components 24 are provided, one first insulating component 24 isolates the shell 22 from the electrode tabs 212 at one end of the electrode assembly 2111 in the thickness direction Z of the end cover 23, and the other first insulating component 24 isolates the shell 22 and the electrode tabs 212 at the other end of the electrode assembly 2111 in the thickness direction of the end cover 23.

In some embodiments, still referring to FIG. 4, the battery cell 20 may further comprises a positive electrode terminal 40 and a negative electrode terminal 50, wherein the positive electrode terminal 40 is configured to be electrically connected to the positive electrode tab 212*a*, and the negative electrode terminal 50 is configured to be electrically connected to the negative electrode tab 212*b*.

In a case where one end cover 23 of the battery cell 20 is provided, the positive electrode terminal 40 and the negative electrode terminal 50 are mounted on the same end cover 23. In a case where two end covers 23 of the battery cell 20 are provided, the positive electrode terminal 40 and the negative electrode terminal 50 may be respectively mounted on the two end covers 23.

The positive electrode terminal 40 and the negative electrode terminal 50 are used as two output electrodes of the battery cell 20 to output electric energy of the battery cell 20. In a case where a plurality of battery cells 20 are electrically connected through the busbar component 31, if one end of the busbar component 31 is connected to the positive electrode terminal 40 of one battery cell 20 and the other end of the busbar component 31 is connected to the negative electrode terminal 50 on the end cover 23 of another battery cell 20, a series connection of two battery cells 20 can be realized; and if the positive electrode terminals 40 of two battery cells 20 are connected through one busbar component 31 and the negative electrode terminals 50 on the end covers 23 of the two battery cells 20 are connected through another busbar component 31, a parallel connection of the two battery cells 20 can be realized.

In some embodiments, the battery cell 20 may further comprise current collecting members 60. The positive electrode tab 212*a* is electrically connected to the positive electrode terminal 40 through one current collecting member 60, and the negative electrode tab 212*b* is electrically connected to the negative electrode terminal 50 through the other current collecting member 60.

The current collecting member 60 may be a metal conductor such as a copper conductor, an iron conductor, an aluminium conductor, a stainless steel conductor, and an aluminium alloy conductor.

Figure 5:
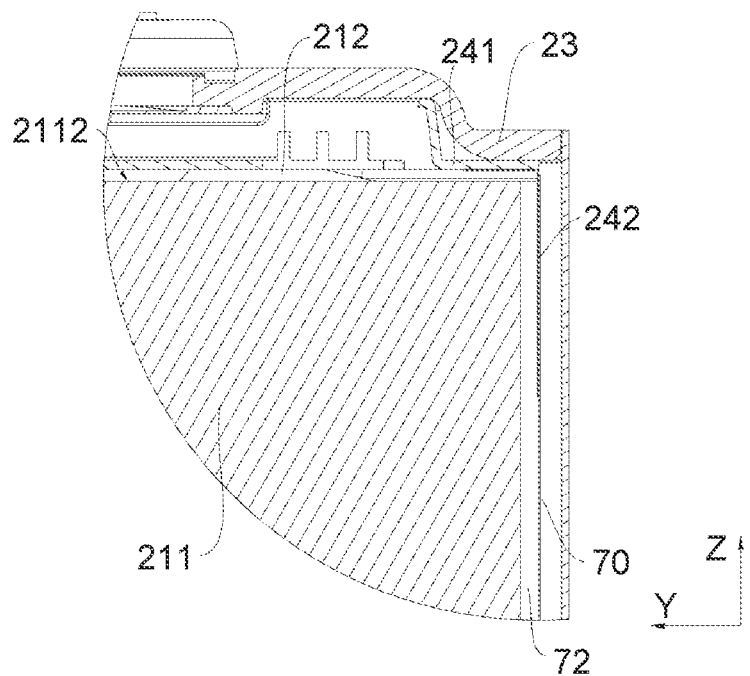
FIG. 5 is a partial sectional view of the battery cell shown in FIG. 4.

In the embodiments of the present application, referring to FIG. 4 and FIG. 5 which is a partial sectional view of the battery cell 20 shown in FIG. 4, in order to improve the safety of the battery cell 20, the first insulating component 24 comprises an insulating main body 241 and insulating parts 242. The insulating main body 241 is located on a side, facing the electrode tabs 212, of the end cover 23, and is configured to isolate the battery core 21 from the end cover 23. The insulating part 242 extends from the insulating main body 241 and away from the end cover 23 and is partially located between an outer circumferential surface of the main body part 211 and an inner circumferential surface of the shell 22, and the insulating part 242 is configured to isolate the electrode tabs 212 from the shell 22.

As the insulating part 242 extends from the insulating main body 241 and away from the end cover 23 and is partially located between the outer circumferential surface of the main body part 211 and the inner circumferential surface of the shell 22, the insulating part 242 plays a role of isolating the electrode tabs 212 from the shell 22, so as to reduce the risk of a short circuit caused by the contact between the electrode tabs 212 and the shell 22. Thus, the safety of the battery cell 20 is effectively improved.

In a case where the main body part 211 comprises a plurality of electrode assemblies 2111, the outer circumferential surface of the main body part 211 is an outer circumferential surface of the integral structure formed by all the electrode assemblies 2111. In a case where only one electrode assembly 2111 of the main body part 211 is provided, the outer circumferential surface of the main body part 211 is an outer circumferential surface of the electrode assembly 2111.

As an example, the insulating main body 241 and the insulating part 242 may be formed into an integral structure.

It should be noted that the insulating part 242 of the first insulating component 24 may be one or more. One insulating part 242 may play a role of isolating one electrode tab 212 from the shell 22, or play a role of isolating a plurality of electrode tabs 212 from the shell 22.

In some embodiments, in the thickness direction Z of the end cover 23, a top surface 2112 is formed at an end, facing the end cover 23, of the main body part 211; the top surface 2112 is connected to the outer circumferential surface of the main body part 211; the electrode tab 212 is arranged on the top surface 2112 in a protrusive manner; and the insulating part 242 extends from the insulating main body 241 to be away from the end cover 23 and partially exceeds the top surface 2112, so as to be partially located between the outer circumferential surface of the main body part 211 and the inner circumferential surface of the shell 22.

In a case where one electrode assembly 2111 of the main body part 211 is provided, a surface of one end of the electrode assembly 2111 in the thickness direction Z of the end cover 23 is the top surface 2112. In a case where a plurality of electrode assemblies 2111 of the main body part 211 are provided, surfaces of the same ends of the plurality of electrode assemblies 2111 in the thickness direction Z of the end cover 23 jointly form the top surface 2112.

In some embodiments, the battery cell 20 may further comprise a second insulating component 70 located in the shell 22. The second insulating component 70 is configured to isolate the main body part 211 from the shell 22, and the insulating part 242 is connected to the second insulating component 70.

The second insulating component 70 plays a role of isolating the main body part 211 from the shell 22, so as to reduce the risk of a short circuit caused by the contact between the main body part 211 and the shell 22. The insulating part 242 is connected to the second insulating component 70, and the second insulating component 70 can play a role of stabilizing the insulating part 242 and keep the insulating part 242 at a position where the electrode tab 212 and the shell 22 are isolated from each other.

The insulating part 242 and the second insulating component 70 may be connected in various ways. For example, the insulating part 242 and the second insulating component 70 are connected by hot melting. For another example, the insulating part 242 and the second insulating component 70 are connected by bonding. Such two connection ways are simple and easy to realize and can guarantee firmness of the insulating part and the second insulating component after the insulating part 242 and the second insulating component 70 are connected.

Both the second insulating component 70 and the first insulating component 24 may be made of insulating materials such as rubber and plastic.

In some embodiments, an accommodating space 72 having one end provided with a second opening 71 is formed in the second insulating component 70, and the accommodating space 72 is configured to accommodate at least one portion of the main body part 211; and the second opening 71 faces the insulating main body 241. The insulating part 242 extends from the insulating main body 241 towards the second opening 71 and is connected to the second insulating component 70.

As the accommodating space 72 having one end provided with the second opening 71 is formed in the second insulating component 70, and the accommodating space 72 is configured to accommodate at least one portion of the main body part 211, the second insulating component 70 can separate the battery core 21 from the shell 22 in different directions. As the insulating part 242 extends from the insulating main body 241 towards the second opening 71 and is connected to the second insulating component 70, the first insulating component 24, the second insulating component 70, and the battery core 21 can serve as an integral structure in a process of assembling the battery cell 20, so as to be more conveniently assembled with the shell 22. Thus, the assembly efficiency of the battery cell 20 is improved.

The accommodating space 72 is configured to accommodate at least one portion of the battery core 21. It can be understood that the battery core 21 may be partially accommodated in the accommodating space 72, or entirely accommodated in the accommodating space 72.

In the present embodiment, the shell 22 may be of a hollow structure having one end provided with the first opening 221, and only one end cover 23 and one first insulating component 24 of the battery monomer 20 may be provided.

As an example, the second insulating component 70 may be of a box structure formed by folding of a sheet-like component.

As an example, the insulating part 242 partially extends into the accommodating space 72 of the second insulating component 70 and is connected to an inner circumferential surface of the second insulating component 70.

It should be noted that, in other embodiments, the second insulating component 70 may be of another structure. For example, an accommodating space 72 of which two ends are provided with second openings 71 is formed in the second insulating component 70, and the accommodating space 72 is configured to accommodate at least one portion of the main body part 211. In this case, the shell 22 may be of a hollow structure of which two ends are provided with first openings 221. Two end covers 23 of the battery cell 20 may be provided, and the two end covers 23 are configured to cover the two first openings 221, respectively; and one end cover 23 is correspondingly provided with one first insulating component 24.

Figure 6:
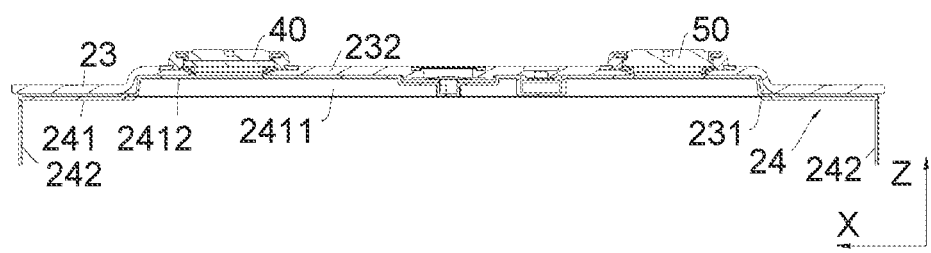
FIG. 6 is an assembly drawing of an end cover and first insulating component shown in FIG. 4.

In some embodiments, referring to FIG. 6 which is an assembly drawing of the end cover 23 and first insulating component 24 shown in FIG. 4, a first recess 2411 is formed in an inner side of the insulating main body 241, and a first protrusion 2412 is formed at a position, corresponding to the first recess 2411, of an outer side of the insulating main body 241. A second recess 231 is formed in an inner side of the end cover 23, and a second protrusion 232 is formed at a position corresponding to the second recess 231 on an outer side of the end cover 23. The second recess 231 is configured to accommodate at least one portion of the first protrusion 2412, and the first recess 2411 is configured to accommodate at least one portion of the current collecting member 60 (not shown in FIG. 6) to retain more space for the battery core 21, which is conducive to improving the energy density of the battery cell 20.

The positive electrode terminal 40 and the negative electrode terminal 50 can be both mounted on the second protrusion 232.

In the embodiments of the present application, the insulating part 242 of the first insulating component 24 may be one or more, and the number of the insulating part 242 can be determined according to specific requirements.

Figure 7:
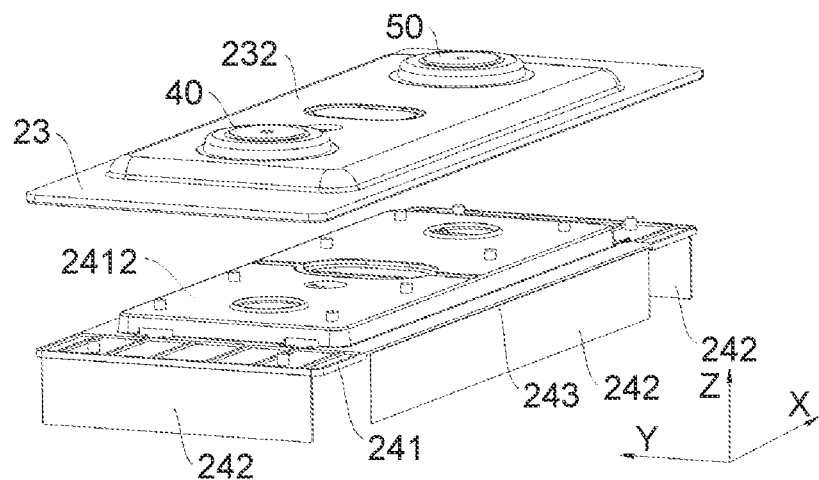
FIG. 7 is an exploded view of the end cover and first insulating component shown in FIG. 4.

In some embodiments, referring to FIG. 7 which is an exploded view of the end cover 23 and first insulating component 24 shown in FIG. 4, the first insulating component 24 comprises a plurality of insulating parts 242 circumferentially distributed along the outer circumferential surface of the main body part 211 (shown in FIG. 4), such that the insulating part 242 can isolate the electrode tab 212 from the shell 22 in different directions. Thus, the risk of the contact between the electrode tabs 212 and the shell 22 is reduced.

In the present embodiment, every two adjacent insulating parts 242 may have a gap or be connected together. If every two adjacent insulating parts 242 are connected together, all the insulating parts 242 can form a surrounding structure extending along the whole circumference of the insulating main body 241, so as to play a better role of isolating the electrode tabs 212 from the shell 22.

In some embodiments, still referring to FIG. 7, the insulating parts 242 are connected to peripheral edges of the insulating main body 241, so as to be closer to the inner circumferential surface of the shell 22; and the main body part 211 of the battery core 21 is configured as large as possible, which is conducive to improving the energy density of the battery cell 20.

A case in which the insulating main body 241 is rectangular is taken as an example. Any one of four edges of the insulating main body 241 may be provided with the first insulating component 24. That is, the four edges of the insulating main body 241 are all provided with the insulating parts 242, or partially provided with the insulating part 242. In FIG. 7, a case in which the four edges of the insulating main body 241 are all provided with the first insulating component 24 is shown as an example.

In some embodiments, still referring to FIG. 7, a crease 243 is formed at the connection position between the insulating part 242 and the insulating main body 241, and the insulating part 242 is hinged to the insulating main body 241 along the crease 243.

As the crease 243 is formed at the connection position between the insulating part 242 and the insulating main body 241, the first insulating component 24 can be formed by folding a plate-shaped component along the crease 243. As the insulating part 242 is hinged to the insulating main body 241 along the crease 243, when the main body part 211 of the battery core 21 extrudes the insulating part 242 due to expansion of the main body part, the insulating part 242 can turn by a certain angle about the crease 243 relative to the insulating main body 241, so that the risk of damage, caused by extrusion of the insulating part 242 during the expansion of the main body part, of the main body part 211 is reduced.

In a case where the battery cell 20 is not provided with the second insulating component 70, or the battery cell is provided with the second insulating component 70, but the insulating part 242 is not connected to the second insulating component 70, after the main body part 211 of the battery core 21 extrudes the insulating part 242 due to the expansion of the main body part, the insulating part 242 can turn over by a certain angle along the crease 243. In a case where the battery cell 20 is provided with the second insulating component 70 and the insulating part 242 and the second insulating component 70 are connected together, after the main body part 211 of the battery core 21 extrudes the insulating part 242 due to the expansion of the main body part, the insulating part 242 can also turn over by a certain angle along the crease 243, and the insulating part 242 causes certain deformation of the second insulating component 70 in a turn-over process.

It should be noted that, in other embodiments, the insulating part 242 may be fixedly connected to the insulating main body 241; that is, the insulating part 242 is unable to turn over relative to the insulating main body 241.

Figure 8:
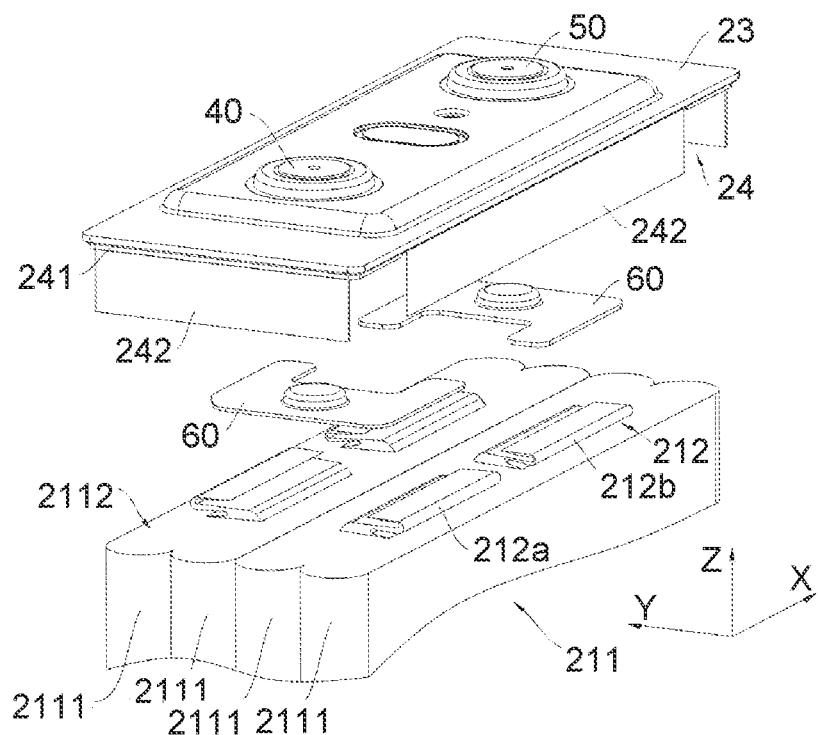
FIG. 8 is a partial exploded view of the battery cell shown in FIG. 4.

In some embodiments, referring to FIG. 8 which is a partial exploded view of the battery cell 20 show in FIG. 4, the main body part 211 comprises a plurality of electrode assemblies 2111 arranged in a stacked manner in the width direction Y of the end cover 23; and the end of the electrode assembly 2111 in the thickness direction Z of the end cover 23 is provided with two electrode tabs 212 arrayed in the length direction X of the end cover 23. Two ends of the insulating main body 241 in the length direction X of the end cover 23 are provided with the insulating parts 242 located on two sides of the main body part 211. In the length direction X of the end cover 23, the insulating part 242 at each end of the insulating main body 241 is configured to isolate one electrode tab 212 of the electrode assembly 2111 from the shell 22.

As the two ends of the insulating main body 241 in the length direction X of the end cover 23 are respectively provided with the insulating parts 242 located on the two sides of the main body part 211, the insulating part 242 at each end of the insulating main body 241 can correspondingly isolate one electrode tab 212 of the electrode assembly 2111 from the shell 22 in the length direction X of the end cover 23, that is, the shell 22 and one electrode tab 212 of the electrode assembly 2111 in the length direction X of the end cover 23 are isolated from each other by the insulating part 242 at one end of the insulating main body 241, and the shell 22 and the other electrode tab 212 of the electrode assembly 2111 in the length direction X of the end cover 23 are isolated by the insulating part 242 at the other end of the insulating main body 241, such that the two electrode tabs 212 of the electrode assembly 2111 are unlikely to be in contact with the shell 22 in the length direction X of the end cover 23.

It should be noted that the end of the electrode assembly 2111 in the thickness direction Z of the end cover 23 is provided with two electrode tabs 212 arrayed in the length direction X of the end cover 23, and the two electrode tabs 212 may be respectively a positive electrode tab 212*a* and a negative electrode tab 212*b*.

As an example, the insulating part 242 is of a plate-shaped structure.

The insulating part 242 at each end of the insulating main body 241 in the length direction X of the end cover 23 may be one or more.

In some embodiments, as shown in FIG. 8, the two ends of the insulating main body 241 in the length direction X of the end cover 23 are each provided with one insulating part 242, that is, the shell 22 and the electrode tab 212 on one side of the electrode assembly 2111 in the length direction X of the end cover 23 are isolated from each other by the same insulating part 242, and the shell 22 and the electrode tab 212 on the other side of the electrode assembly 2111 in the length direction X of the end cover 23 are also isolated from each other by the same insulating part 242. In addition, the insulating parts 242 at the two ends of the insulating main body 241 in the length direction X of the end cover 23 play a role of isolating the electrode assembly 2111 from the shell 22. Even if the electrode assembly 2111 expands in the length direction X of the end cover 23, the electrode assembly is unlikely to be in contact with the shell 22. Thus, a short circuit caused by the contact between the electrode assembly 2111 and the shell 22 after the expansion of the electrode assembly is less prone to occur.

In other embodiments, the two ends of the insulating main body 241 in the length direction X of the end cover 23 are each provided with a plurality of insulating parts 242. The shell 22 and the electrode tab 212 on a side of one electrode assembly 2111 in the length direction X of the end cover 23 are isolated from each other by one insulating part 242. Alternatively, in a case where two adjacent electrode assemblies 2111 form an electrode assembly unit, the shell 22 and the electrode tabs 212 on one sides of two electrode assemblies 2111 forming the electrode assembly unit in the length direction X of the end cover 23 are isolated from each other by the same insulating part 242.

Figure 9:
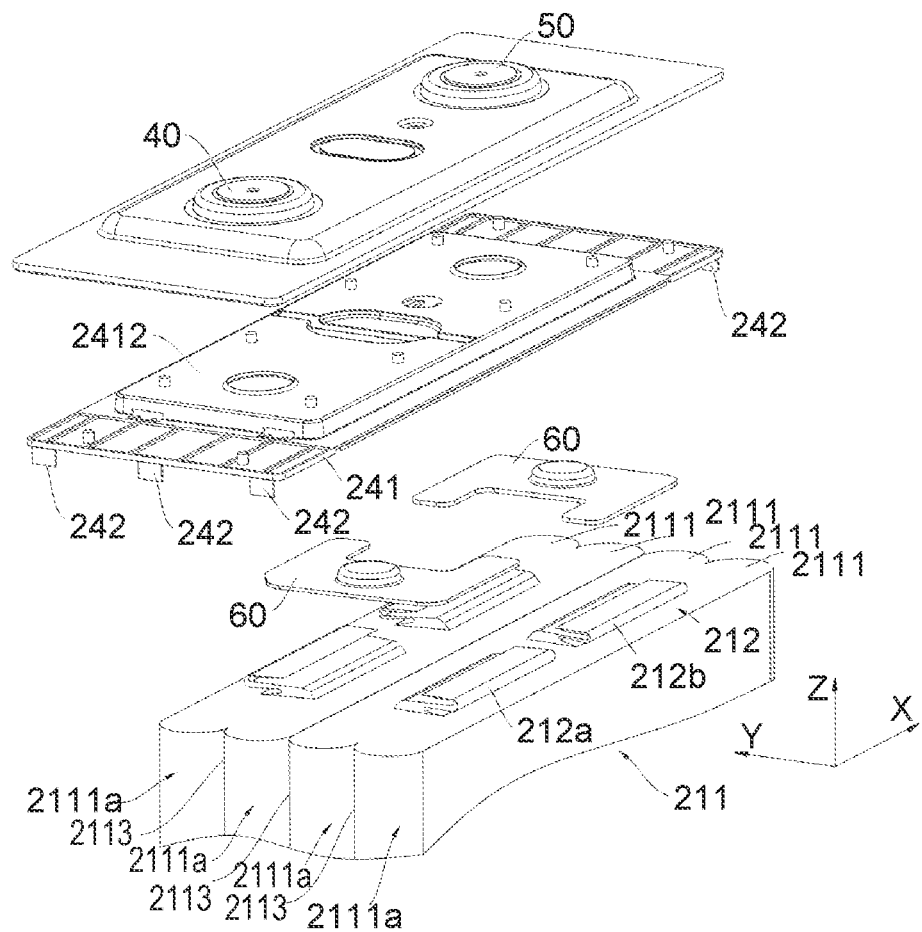
FIG. 9 is a partial exploded view of a battery cell provided by other embodiments of the present application.

In some embodiments, referring to FIG. 9 which is a partial exploded view of the battery cell 20 provided by other embodiments of the present application, the two ends of the insulating main body 241 in the length direction X of the end cover 23 are each provided with a plurality of insulating parts 242 in a spaced manner. A receding groove 2113 is formed between every two adjacent electrode assemblies 2111 and located at an end of the main body part 211 in the length direction X of the end cover 23, and the receding groove 2113 is configured to avoid the insulating part 242. The receding groove 2113 plays a role of avoiding the insulating part 242. Thus, during the expansion of the electrode assembly 2111, the electrode assembly is unlikely to be extruded by the insulating part 242, such that the risk of damage, caused by extrusion of the insulating part 242 during the expansion of the electrode assembly, of the electrode assembly 2111 is reduced.

As an example, the receding groove 2113 corresponds to the insulating part 242 one by one. A case in which four electrode assemblies 2111 of the main body part 211 are provided is taken as an example. Three receding grooves 2113 are formed in each of two ends of the main body part 211 in the length direction X of the end cover 23, and three insulating parts 242 are arranged at each of the two ends of the insulating main body 241 in the length direction X of the end cover 23 in a spaced manner.

Optionally, round surfaces 2111a are formed at two ends of the electrode assembly 2111 in the length direction X of the end cover 23. Two round surfaces 2111a, located at the same end of the main body part 211 in the length direction X of the end cover 23, of every two adjacent electrode assemblies 2111 jointly define the receding groove 2113. The receding groove 2113 is jointly defined by the round surfaces 2111a of two adjacent electrode assemblies 2111, such that a simple structure is achieved.

In the present embodiment, the electrode assembly 2111 may be of the winding structure. After the electrode assembly 2111 is formed by winding the positive electrode plate, the negative pole plate, and the isolating membrane, the round surfaces 2111a are naturally formed at the two ends of the electrode assembly 2111 in the length direction X of the end cover 23.

In the present embodiment, the insulating part 242 may be hinged to the insulating main body 241 along the crease 243, and the insulating part 242 may also be fixedly connected to the insulating main body 241. In FIG. 9, as an example, the insulating part 242 is fixedly connected to the insulating main body 241, that is, the insulating part 242 is unable to turn over relative to the insulating main body 241.

Figure 10:
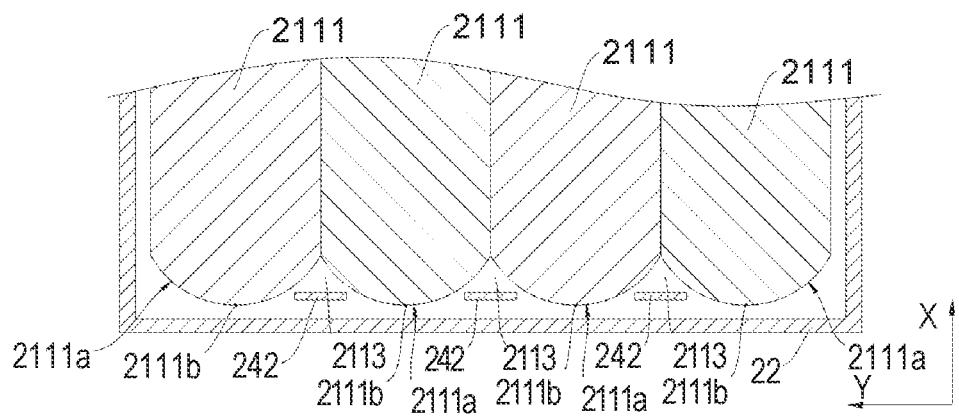
FIG. 10 is a position relationship diagram of an insulating part and receding groove shown in FIG. 9.

In some embodiments, referring to FIG. 10 which is a position relationship diagram of the insulating part 242 and receding groove 2113 shown in FIG. 9, in the length direction X of the end cover 23 towards the outside, the insulating part 242 does not exceed the receding groove 2113. That is, the insulating part 242 is completely located in the receding groove 2113 in the length direction X of the end cover 23, and the insulating part 242 does not excessively occupy the space between the outer circumferential surface of the main body part 211 and the inner circumferential surface of the shell 22, which is conducive to improving the energy density of the battery cell 20.

A case in which the receding groove 2113 is jointly defined by the round surfaces 2111a of the two electrode assemblies 2111 is taken as an example. In the length direction X of the end cover 23, a cross section of the round surface 2111a has a protruding point 2111b closest to the inner circumferential surface of the shell 22. In the length direction X of the end cover 23 towards the outside, the insulating part 242 does not exceed the receding groove 2113, that is, the insulating part 242 does not exceed the protruding point 2111b in the length direction X of the end cover 23 towards the outside.

In some embodiments, still referring to FIG. 8, two ends of the insulating main body 241 in the width direction Y of the end cover 23 are provided with the insulating parts 242 located on two sides of the main body part 211, so as to isolate the electrode tabs 212 from the shell 22 in the width direction Y of the end cover 23. In this way, the risk of the contact between the electrode tabs 212 and the shell 22 is further reduced.

In the present embodiment, the two ends of the insulating main body 241 in the length direction X of the end cover 23 may be provided with the insulating parts 242, or not provided with the insulating parts 242. In a case where the two ends of the insulating main body 241 in the length direction X of the end cover 23 are provided with the insulating parts 242, as shown in FIG. 8, each end of the insulating main body 241 in the length direction X of the end cover 23 may be provided with one insulating part 242. As shown in FIG. 9, each end of the insulating main body 241 in the length direction X of the end cover 23 may be provided with a plurality of insulating parts 242.

Figure 11:
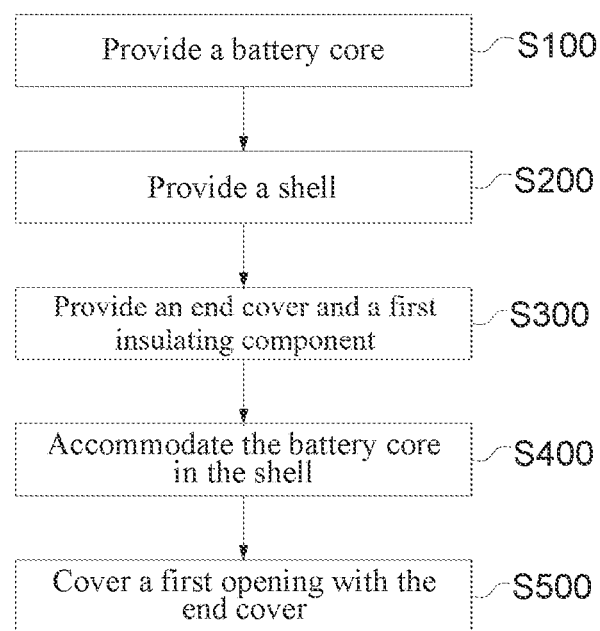
FIG. 11 is a flow chart of a method provided by some embodiments of the present application for manufacturing the battery cell.

The embodiments of the present application provide a method for manufacturing a battery cell 20. Referring to FIG. 11 which is a flow chart of the method provided by some embodiments of the present application for manufacturing the battery cell 20, the method comprises:

S100, provide a battery core 21, wherein the battery core 21 comprises a main body part 211 and electrode tabs 212 protruding from the main body part 211;

S200, provide a shell 22 having a first opening 221;

S300, provide an end cover 23 and a first insulating component 24, wherein the first insulating component 24 comprises an insulating main body 241 and an insulating part 242;

S400, accommodate the battery core 21 in the shell 22; and

S500, cover the first opening 221 with the end cover 23, wherein the insulating main body 241 is located on a side, facing the electrode tabs 212, of the end cover 23.

Herein, the insulating main body 241 is configured to isolate the battery core 21 from the end cover 23; the insulating part 242 extends from the insulating main body 241 and away from the end cover 23 and is partially located between an outer circumferential surface of the main body part 211 and an inner circumferential surface of the shell 22; and the insulating part 242 is configured to isolate the electrode tabs 212 from the shell 22.

In the method, a sequence of step S100, step S200, and step S300 is not limited. For example, step S300 may be performed first, then step S200 is performed, and then step S100 is performed.

It should be noted that a related structure of the battery cell 20 manufactured through the method provided by the above embodiments can refer to the battery unit 20 provided by the foregoing embodiments, and details are not repeated herein.

Figure 12:
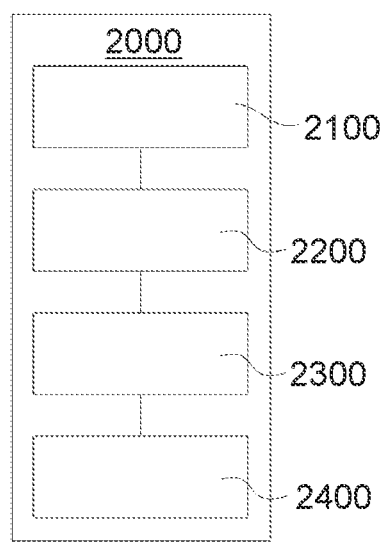
FIG. 12 is a schematic block diagram of a manufacturing device provided by some embodiments of the present application for the battery cell.

In addition, the embodiments of the present application further provide a manufacturing device 2000 for the battery cell 20. Referring to FIG. 12 which is a schematic block diagram of the device 2000 provided by some embodiments of the present application for manufacturing the battery cell 20, the device 2000 comprises a first providing device 2100, a second providing device 2200, a third providing device 2300, and an assembly device 2400.

The first providing device 2100 is configured to provide a battery core 21, and the battery core 21 comprises a main body part 211 and electrode tabs 212 protruding from the main body part 211. The second providing device 2200 is configured to provide a shell 22 having a first opening 221. The third providing device 2300 is configured to provide an end cover 23 and a first insulating component 24, and the first insulating component 24 comprises an insulating main body 241 and an insulating part 242. The assembly device 2400 is configured to accommodate the battery core 21 in the shell 22, and the assembly device 2400 is also configured to cover the first opening 221 with the end cover 23.

Herein, the insulating main body 241 is configured to isolate the battery core 21 from the end cover 23; the insulating part 242 extends from the insulating main body 241 and away from the end cover 23 and is partially located between an outer circumferential surface of the main part 211 and an inner circumferential surface of the shell 22; and the insulating part 242 is configured to isolate the electrode tabs 212 from the shell 22.

It should be noted that a related structure of the battery cell 20 manufactured through the manufacturing device 2000 provided by the above embodiments can refer to the battery unit 20 provided by the foregoing embodiments, and details are not repeated herein.

It should be noted that the embodiments of the present application and the features in the embodiments can be combined with each other without conflict.

The above embodiments are only used to explain the technical solutions of the present application, and are not intended to limit the present application, and various modifications and changes of the present application may be made by those skilled in the art. Any modifications, equivalent substitutions, improvements, and the like made within the spirit and principle of the present application should be included within the protection scope of the present application.

The invention claimed is:

1. A battery cell, characterized by comprising:
   a battery core comprising a main body part and electrode tabs protruding from the main body part;
   a shell having a first opening and being configured to accommodate the battery core;
   an end cover configured to cover the first opening; and
   a first insulating component comprising an insulating main body and an insulating part, wherein
   the insulating main body is located on a side, facing the electrode tabs of the end cover, and the insulating main body is configured to isolate the battery core from the end cover; and
   the insulating part extends from the insulating main body and away from the end cover and is partially located between an outer circumferential surface of the main body part and an inner circumferential surface of the shell, and the insulating part is configured to isolate the electrode tabs from the shell;
   the main body part comprises a plurality of electrode assemblies arranged in a stacked manner in a width direction Y of the end cover;
   the two ends of the insulating main body in the length direction X of the end cover are each provided with a plurality of the insulating parts located on two sides of the main body part; and
   a receding groove is formed between every two adjacent electrode assemblies and located at an end of the main body part in the length direction X of the end cover, and the receding groove is configured to avoid the insulating part.

2. The battery cell according to claim 1, characterized in that the battery cell further comprises:
   a second insulating component located in the shell, wherein the second insulating component is configured to isolate the main body part from the shell, and the insulating part is connected to the second insulating component.

3. The battery cell according to claim 2, characterized in that an accommodating space having one end provided with a second opening is formed in the second insulating component, and the accommodating space is configured to accommodate at least one portion of the main body part; the second opening faces the insulating main body; and
   the insulating part extends from the insulating main body towards the second opening and is connected to the second insulating component.

4. The battery cell according to claim 2, characterized in that the insulating part and the second insulating component are connected by hot melting; or the insulating part and the second insulating component are connected by bonding.

5. The battery cell according to claim 1, characterized in that the insulating part is connected to a peripheral edge of the insulating main body.

6. The battery cell according to claim 1, characterized in that a crease is formed at a connection position between the insulating part and the insulating main body, and the insulating part is hinged to the insulating main body along the crease.

7. The battery cell according to claim 1, characterized in that the first insulating component comprises a plurality of the insulating parts circumferentially distributed along the outer circumferential surface of the main body part.

8. The battery cell according to claim 1, characterized in that an end of each electrode assembly in a thickness direction Z of the end cover is provided with two of the electrode tabs arrayed in a length direction X of the end cover; and
   in the length direction X of the end cover, the insulating part at each end of the insulating main body is configured to isolate one of the electrode tabs of the electrode assembly from the shell.

9. The battery cell according to claim 1, characterized in that round surfaces are formed at two ends of the electrode assembly in the length direction X of the end cover; and two round surfaces, located at the same end of the main body part in the length direction X of the end cover, of every two adjacent electrode assemblies jointly define the receding groove.

10. The battery cell according to claim 1, characterized in that the insulating part does not exceed the receding groove in the length direction X of the end cover towards outside.

11. The battery cell according to claim 1, characterized in that two ends of the insulating main body in the width direction Y of the end cover are provided with the insulating parts located on two sides of the main body part, so as to isolate the electrode tabs from the shell in the width direction Y of the end cover.

12. A battery, characterized by comprising:
one or more battery cells according to claim 1, and
a case for accommodating the one or more battery cells.

13. An electrical device, characterized by comprising the battery according to claim 12.

14. A method for manufacturing a battery cell, characterized by comprising:
providing a battery core comprising a main body part and electrode tabs protruding from the main body part;
providing a shell having a first opening;
providing an end cover and a first insulating component, wherein the first insulating component comprises an insulating body and an insulating part;
accommodating the battery core in the shell; and
covering the first opening with the end cover, wherein the insulating main body is located on a side, facing the electrode tabs, of the end cover; and, wherein
the insulating main body is configured to isolate the battery core from the end cover; and
the insulating part extends from the insulating main body and away from the end cover and is partially located between an outer circumferential surface of the main body part and an inner circumferential surface of the shell, and the insulating part is configured to isolate the electrode tabs from the shell; the main body part comprises a plurality of electrode assemblies arranged in a stacked manner in a width direction Y of the end cover; the two ends of the insulating main body in the length direction X of the end cover are each provided with a plurality of the insulating parts located on two sides of the main body part; and a receding groove is formed between every two adjacent electrode assemblies and located at an end of the main body part in the length direction X of the end cover, and the receding groove is configured to avoid the insulating part.

15. A battery cell manufacturing device, characterized by comprising:
a first providing device, which is configured to provide a battery core, wherein the battery core comprises a main body part and electrode tabs protruding from the main body part;
a second providing device configured to provide a shell having a first opening;
a third providing device configured to provide an end cover and a first insulating component, wherein the first insulating component comprises an insulating main body and an insulating part;
an assembly device configured to accommodate the battery core in the shell, and being configured to cover the first opening with the end cover; and, wherein
the insulating main body is configured to isolate the battery core from the end cover; and
the insulating part extends from the insulating main body and away from the end cover and is partially located between an outer circumferential surface of the main body part and an inner circumferential surface of the shell, and the insulating part is configured to isolate the electrode tabs from the shell; the main body part comprises a plurality of electrode assemblies arranged in a stacked manner in a width direction Y of the end cover; the two ends of the insulating main body in the length direction X of the end cover are each provided with a plurality of the insulating parts located on two sides of the main body part; and a receding groove is formed between every two adjacent electrode assemblies and located at an end of the main body part in the length direction X of the end cover, and the receding groove is configured to avoid the insulating part.

* * * * *